United States Patent
Liu et al.

(10) Patent No.: US 9,085,704 B2
(45) Date of Patent: Jul. 21, 2015

(54) COATING COMPOSITION, METHOD FOR COATING A SURFACE OF A MATERIAL USING THE SAME, AND SURFACE TREATED MATERIALS HAVING THE SAME

(75) Inventors: Zhihua H. Liu, Shanghai (CN); Xinhua Shawn Wu, Shanghai (CN)

(73) Assignee: Dow Corning (China) Holding Co., Ltd., Shanghai (CN)

(*) Notice: Subject to any disclaimer, the term of this patent is extended or adjusted under 35 U.S.C. 154(b) by 0 days.

(21) Appl. No.: 14/235,269

(22) PCT Filed: Jul. 26, 2012

(86) PCT No.: PCT/CN2012/079159
§ 371 (c)(1),
(2), (4) Date: Jan. 27, 2014

(87) PCT Pub. No.: WO2013/017033
PCT Pub. Date: Feb. 7, 2013

(65) Prior Publication Data
US 2014/0163155 A1   Jun. 12, 2014

(30) Foreign Application Priority Data
Jul. 29, 2011 (CN) .......................... 2011 1 0221874

(51) Int. Cl.
| | | |
|---|---|---|
| *C09D 7/12* | (2006.01) | |
| *D06M 13/513* | (2006.01) | |
| *D06M 15/643* | (2006.01) | |
| *D06M 15/647* | (2006.01) | |
| *C09D 183/08* | (2006.01) | |
| *C08G 77/16* | (2006.01) | |
| *C08G 77/26* | (2006.01) | |

(52) U.S. Cl.
CPC .............. *C09D 7/125* (2013.01); *C09D 183/08* (2013.01); *D06M 13/513* (2013.01); *D06M 15/643* (2013.01); *D06M 15/647* (2013.01); *C08G 77/16* (2013.01); *C08G 77/26* (2013.01)

(58) Field of Classification Search
None
See application file for complete search history.

(56) References Cited

U.S. PATENT DOCUMENTS

| | | | |
|---|---|---|---|
| 4,486,281 A * | 12/1984 | Pigeon ............................. | 522/40 |
| 5,118,535 A | 6/1992 | Cray et al. | |
| 5,175,057 A * | 12/1992 | Wengrovius et al. ......... | 428/447 |
| 5,196,497 A * | 3/1993 | Weber et al. .................... | 528/14 |
| 5,302,671 A * | 4/1994 | Cifuentes et al. ............. | 525/477 |
| 5,391,675 A | 2/1995 | Cray et al. | |
| 5,561,179 A * | 10/1996 | Borzatta et al. ................. | 524/99 |
| 5,663,269 A * | 9/1997 | Chu et al. ........................ | 528/14 |
| 6,254,811 B1 * | 7/2001 | Finger et al. .................... | 264/35 |
| 6,284,860 B1 * | 9/2001 | Sommer et al. ................. | 528/23 |
| 6,384,254 B1 | 5/2002 | Omura | |
| 6,515,095 B1 | 2/2003 | Omura et al. | |
| 6,864,340 B2 * | 3/2005 | Levandoski et al. ............ | 528/34 |
| 7,094,858 B2 * | 8/2006 | Sixt et al. ......................... | 528/18 |
| 7,238,768 B2 * | 7/2007 | Hupfield et al. ................ | 528/38 |
| 2010/0247474 A1 * | 9/2010 | Hirai ........................ | 424/70.122 |

FOREIGN PATENT DOCUMENTS

JP    2002-363408    12/2002

* cited by examiner

*Primary Examiner* — Robert S Loewe
(74) *Attorney, Agent, or Firm* — Warner Norcross & Judd LLP

(57) ABSTRACT

A coating composition, a method for coating a surface of a material using the same, and surface treated materials having the same are provided. The coating composition comprises a nitrogen atom-containing organopolysiloxane represented by the average siloxane unit formula (1): $(R^1R^2R^3SiO_{1/2})_a(SiR^1{}_2O_{2/2})_b(R^2R^3SiO_{2/2})_c(R^2R^3{}_2SiO_{1/2})_d$ (1) wherein $R^1$ is a nitrogen-free, substituted or unsubstituted, monovalent organic group of 1 to 20 carbon atoms, $R^2$ is a monovalent organic group containing at least one nitrogen atom, $R^3$ is an organoxy group represented by $-OR^1$, "a" is a positive number of 0.7 to 1.3; "b" is a positive number of 2 to 500; "c" is a positive number of 0 to 10; "d" is a positive number 0.7 to 1.3: and a+d is at least 2.

17 Claims, No Drawings

US 9,085,704 B2

COATING COMPOSITION, METHOD FOR COATING A SURFACE OF A MATERIAL USING THE SAME, AND SURFACE TREATED MATERIALS HAVING THE SAME

CROSS REFERENCE TO RELATED APPLICATIONS

This application is a U.S. national stage filing under 35 U.S.C. §371 of PCT Application No. PCT/CN2012/079159 filed on Jul. 26, 2012, currently pending which claims the benefit of Chinese Patent Application No. 20110221874.6 filed Jul. 29, 2011 under 35 U.S.C. §119 (a)-(d) and 35 U.S.C. §365(a). PCT Application No. PCT/CN2012/079159 and Chinese Patent Application No. 201110221874.6 are hereby incorporated by reference.

TECHNICAL FIELD

The present invention relates to a coating composition, a method for coating a surface of a material using the same, and surface treated materials having the same.

BACKGROUND OF THE INVENTION

Prior art literatures such as U.S. Pat. Nos. 5,391,675, 5,118,535 and 6,515,095 disclose nitrogen atom-containing polysiloxanes and such polysiloxanes can be used for textile treatment. However, such polysiloxanes impart insufficient properties (for example, anti-tape property, solvent resistance and anti-ink property) as a coating composition.

SUMMARY

The present invention provides a novel coating composition which imparts sufficient properties as a coating composition, thus overcoming the defects in the prior art.

In one aspect, the present invention provides a coating composition containing a nitrogen atom-containing organopolysiloxane represented by the average siloxane unit formula (1):

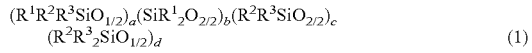

(1)

wherein $R^1$ is a nitrogen-free, substituted or unsubstituted, monovalent organic group of 1 to 20 carbon atoms, $R^2$ is a monovalent organic group containing at least one nitrogen atom, $R^3$ is an organoxy group represented by $-OR^1$, "a" is a positive number of 0.7 to 1.3; "b" is a positive number of 2 to 500; "c" is a positive number of 0 to 10; "d" is a positive number 0.7 to 1.3: and a+d is at least 2.

In a preferred embodiment, the coating composition further comprises an organic polymer binder.

In another preferred embodiment, $R^2$ is a following general formula (2):

$$-R^4(NR^5CH_2CH_2)_eNR^6{}_2 \qquad (2)$$

wherein, $R^4$ is a divalent hydrocarbon group of 1 to 6 carbon atoms, $R^5$ and $R^6$ are independently selected from hydrogen and unsubstituted or hydroxyl-substituted monovalent hydrocarbon groups of 1 to 50 carbon atoms which may be separated by an oxygen atom, and. "e" is an integer of 0 to 4.

In another preferred embodiment, $R^2$ is $-C_3H_6NH_2-C_3H_6NHC_2H_4NH_2$ or $-C_3H_6NHC_2H_4NHC_2H_4NH_2$.

In another preferred embodiment, $R^3$ is $OCH_3$ or $OC_2H_5$.

In another preferred embodiment, "c" is 0.

In another preferred embodiment, "b" is a number of 5 to 100.

In another preferred embodiment, the organic polymer binder is selected from the group comprising acrylic resin, polyurethane resin, epoxy resin, alkyd resin, polyamid resin, and the mixture of at least two of them.

In another preferred embodiment, the composition further comprises a solvent.

In another aspect, the present invention provides a method for coating a surface of a material, characterized in that the surface of the material is coated with the above coating composition.

In still another aspect, the present invention provides surface treated materials with a coating composition

DESCRIPTION OF THE PREFERRED EMBODIMENT (Draft)

<Nitrogen Atom-Containing Organopolysiloxane>

The coating composition of the present invention is characterized by containing a nitrogen atom-containing organopolysiloxane represented by the average siloxane unit formula (1):

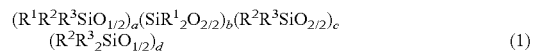

(1)

wherein $R^1$ is a nitrogen-free, substituted or unsubstituted, monovalent organic group of 1 to 20 carbon atoms, $R^2$ is a monovalent organic group containing at least one nitrogen atom, $R^3$ is an organoxy group represented by $-OR^1$, "a" is a positive number of 0.7 to 1.3; "b" is a positive number of 0 to 500; "c" is a positive number of 0 to 10; "d" is a positive number 0.7 to 1.3: and a+d is at least 2.

Such organopolysiloxane impart superior properties to a coating surface which made from the composition of the invention, such as anti-tape property, solvent resistance, anti-ink property, and so on. The amount of the nitrogen atom-containing organopolysiloxane in the coating composition or the present invention is preferably in the rage of 0.001 to 30 weight %, and more preferably in the range of 0.1 to 10 weight %, based on the total weight of the coating composition as 100 weight %.

In the organopolysiloxanes of the invention, the organic groups represented by le include substituted or unsubstituted monovalent hydrocarbon groups of 1 to 20 carbon atoms, and especially 1 to 3 carbon atoms. Examples of the organic groups represented by $R^1$ include alkyl groups such as methyl, ethyl, propyl, butyl, pentyl, hexyl, octyl, decyl, dodecyl, tetradecyl, octadecyl, and eicosyl, alkenyl groups such as vinyl, allyl, propenyl, butenyl and hexenyl, aryl groups such as phenyl and tolyl, aralkyl groups such as benzyl, phenylethyl and phenylpropyl, cycloalkyl groups such as cyclopentyl and cyclohexyl, and substituted ones of the foregoing groups in which some or all of the hydrogen atoms attached to carbon atoms are replaced by halogen atoms, e.g., halogenated alkyl groups such as chloromethyl and trifluoropropyl, and halogenated aryl groups such as chlorophenyl. Of these, preferably at least 90 mol % of the $R^1$ groups are methyl, phenyl, and trifluoropropyl.

$R^2$ stands for monovalent organic groups containing at least one nitrogen atom, for examples, groups of the following formulae (2) and (3).

(2)

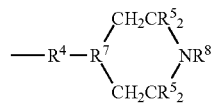
(3)

$R^4$ stands for divalent hydrocarbon groups of 1 to 6 carbon atoms, for example, alkylene groups such as methylene, dimethylene, trimethylene, tetramethylene, pentamethylene, and hexamethylene. Of these, trimethylene is desirable.

$R^5$ and $R^6$ are independently hydrogen or unsubstituted or hydroxyl-substituted monovalent hydrocarbon groups of 1 to 50 carbon atoms which may be separated by an oxygen atom, especially unsubstituted or hydroxyl-substituted alkyl groups. Examples are monovalent hydrocarbon groups of 1 to 8 carbon atoms including alkyl groups such as methyl, ethyl, propyl, butyl, pentyl, hexyl and octyl, and phenyl. Also included are groups represented by COR wherein R is an alkyl group of 1 to 10 carbon atoms and groups represented by $$CH_2CH(OH)CH_2O(C_2H_4O)_nR^9$$

wherein $R^9$ is hydrogen or a monovalent hydrocarbon group such as C 1-8 alkyl, and n is a positive number of 0 to 10. $R^5$ and $R^6$ may be the same or different, and a pair of $R^6$ may also be the same or different. Of these groups, hydrogen and methyl are preferred.

$R^7$ is —CH=, —N=, —OCH=, or —ON=, and $R^8$ is hydrogen or methyl.

In formula (2), "e" is an integer of 0 to 4. Illustrative examples of the organic group $R^2$ represented by formula (2) include

—$C_3H_6NH_2$,

—$C_3H_6NHC_2H_4NH_2$, and

—$C_3H_6NHC_2H_4NHC_2H_4NH_2$.

Also included are substituted ones of these illustrative examples in which one or two hydrogen atoms in NH or $NH_2$ are replaced by COR wherein R is a C1-10 alkyl group and in which one or two hydrogen atoms in NH or $NH_2$ are replaced by $CH_2CH(OH)CH_2O(C_2H_4O)_nR^9$ wherein $R^9$ is hydrogen or a monovalent hydrocarbon group (e.g., C1-8 alkyl) and n is a positive number of 0 to 10.

In formula (1), $R^3$ is an organoxy group represented by —$OR^1$, preferably an alkoxy group of 1 to 6 carbon atoms. Illustrative examples of $R^3$ are methoxy, ethoxy and propoxy groups, with methoxy being most preferred.

Letter "a" is a positive number of 0.7 to 1.3, preferably 1. Letter "d" is a positive number 0.7 to 1.3, preferably 1. "a"+"d" is at least 2, and is preferably 2.

Letter "b" is a positive number of 2 to 500, and preferably 5 to 100, more preferably 40.

Letter "c" is a positive number of 0 to 10, and preferably 0.

<Synthesis of the Nitrogen-Containing Organoplolysiloxane>

The nitrogen atom-containing polyorganosiloxane of the invention can be prepared by effecting alcohol-removing reaction among a (i) diorganopolysiloxane of which both terminals of the molecular chain are capped with hydroxy-diorganosilyl group represented by the following average structural formula:

$$(R^1{}_2(HO)SiO_{1/2})_1(SiR^1{}_2O_{2/2})_f(R^1{}_2(HO)SiO_{1/2})_1;$$

(ii) a dialkoxysilane having a nitrogen atom-containing organic group represented by the following formula:

$$R^1R^2Si(OR^3)_2;$$

(iii) and a trialkoxysilane having a nitrogen atom-containing organic group represented by the following formula:

$$R^2Si(OR^3)_3$$

wherein $R^1$, $R^2$, and $R^3$ are similar to mentioned above. And "f" is a positive number of 0 to 498, and preferably 3 to 98

Preferable reaction temperature might be in the range from room temperature to 150 degree C., more preferably in the range from room temperature to 100 degree C.

By this reaction, a nitrogen atom-containing polysiloxane as represented by formula (1) is readily obtained. Since the alcohol by-product precludes the progress of reaction, reaction must be effected under a nitrogen stream while removing the resultant alcohol. No solvent is generally necessary although a solvent such as toluene or xylene may be used if the component (i) has a high viscosity. If the reaction is slow, a catalyst such as triethylamine or tetramethylene ethylenediamine is optionally used.

The molar ratio of the component (i) to the component (ii) ((i)/(ii)) is preferably in the range of 0.7 to 1.3, and more preferably in the range of 0.8 to 1.2.

The molar ratio of the component (i) to the component (iii) ((i)/(iii)) is preferably in the range of 0.7 to 1.3, and more preferably in the range of 0.8 to 1.2.

And the molar ratio of the component (ii) to the component (iii) ((ii)/(iii)) is preferably in the range of 0.7 to 1.3, and more preferably in the range of 0.8 to 1.2.

<Coating Composition>

The coating composition of the present invention contains the nitrogen-containing organoplolysiloxane. And the composition may take the form of solutions of the polysiloxane in organic solvents such as toluene, xylene, n-hexane, n-heptane, methyl ethyl ketone, methyl isobutyl ketone, cyclohexanone, ethyl acetate, butyl acetate, cellulose acetate-butyl, diethyl ether, isopropyl ether, n-buthyl ether, tetrahydrofuran, dimethyl carbonate, ehylmethyl carbonate, and mineral turpentine, or emulsions of the polysiloxane with the aid of nonionic, anionic, cationic or ampholytic surfactants.

<Organic Polymer Binder>

The composition preferably further comprises an organic polymer binder. Preferred organic polymer binders include polyurethanes, phenolic resins, epoxy resins, acrylic resins, acrylic-modified polyolefin resins, polyester resins, amino-formaldehyde resins, vinyl resins, for example polyvinyl butyral, acryl-urethane resin, alkyd resin, urea resins, amino resins, amino alkyd resins, fluoric resins, and polyamideimide resins. Preferred polyurethanes include copolymers of a polyester or polyether polyol and an aromatic or aliphatic diisocyanate. The level of organic polymer binder can for example be in the range 0.2 or 0.3% up to 90% by weight of the coating composition. Levels of organic polymer binder of for example 5% up to 80% by weight of the coating composition are often preferred.

<Other Components>

To the composition of the invention, suitable additives may be added insofar as the advantages of the composition are not impaired. Such additives are silicon compounds such as dimethylpoly-siloxane, alpha, omega-dihydroxydimethylpolysiloxane, silicone resins, and alkoxy-silanes, and other additives such as inorganic fillers, organic fillers, hollow particles, pigments, dyes, anti-foaming agents, leveling agents, thickeners, anti-blocking agents, UV absorbers, anti-creasing agents, flame retardants, antistatic agents, antioxidants, preservatives, and anti-rusting agents.

<Preparation of the Coating Composition>

The composition of the invention may be prepared by conventional well-known techniques. Usually the nitrogen-atom containing organopolysiloxane and other ingredients are mixed uniformly with a mixer.

<Substrates>

The composition of the invention can apply on the surface of various kinds of substrates by spraying, dipping, knife-coating, roll-coating, and so on. Preferred substrates include organic fibber, glass fibber, carbon fibber and other kinds of fibbers; paper, textile, non-woven fabric and other kinds of fibrous substrates; woods, particle boards, plywood, laminated woods, and other kinds of wood-base materials; glasses, metals, concrete and other kinds of inorganic substrates; and plastics.

<Applicable Industrial Use>

The composition of the invention can be preferably used as an interior and exterior coating for transporting machines, such as automobile, ships and airplane; an interior coating for construction materials, such as wall papers, floor materials, decorative boards, and furniture; an exterior coatings for electric devices, such as mobile phones, personal data assistances, and personal computers; and exterior coating for clothes, stationeries, and accessories.

EXAMPLE

Examples of the invention are given below by way of illustration and not by way of limitation.

Synthetic Example 1

744.5 g (0.25 mol) of dimethylpolysiloxane of which both terminals of the molecular chain are capped with hidoroxy-dimethylsilyl group represented by the following average structural formula: $HO(CH_3)_2SiO—((CH_3)_2SiO)_{38}—Si(CH_3)_2OH$, 48.6 g (0.22 mol) of aminopropyl-triethoxysilane, and 42.0 g (0.22 mol) of aminopropyl-methyldiethoxysilane were mixed homogenously and then heated to 85 degree C. and removing ethanol during the heating. When the generation of ethanol stopped, the reaction mixture was cooled down to room temperature (25 degree C.).

The obtained organopolysiloxane (B-1) was subject to structural identification by $^{29}Si$-NMR. From the analytical results and the reaction route, the product was identified to have the following average siloxane unit formula represented by the formula;

$$(H_2NC_3H_6(CH_3)(C_2H_5O)SiO_{1/2})_1 ((CH_3)_2 SiO_{2/2})_{40}$$
$$(H_2NC_3H_6(C_2H_5O)_2SiO_{1/2})_1$$

Synthetic Example 2

387.1 g (0.13 mol) of dimethylpolysiloxane of which both terminals of the molecular chain are capped with hidoroxy-dimethylsilyl group represented by the following average structural formula: $HO(CH_3)_2SiO—((CH_3)_2SiO)_{38}—Si(CH_3)_2OH$ and 42.9 g (0.21 mol) of aminopropyl-methyldimethoxysilane were mixed homogenously and then heated to 85 degree C. and removing ethanol during the heating. When the generation of ethanol stopped, the reaction mixture was cooled down to room temperature (25 degree C.).

The obtained organopolysiloxane (B-2) was subject to structural identification by $^{29}Si$-NMR. From the analytical results and the reaction route, the product was identified to have the following average siloxane unit formula represented by the formula;

$$(H_2NC_3H_6(CH_3)(CH_3O)SiO_{1/2})_2 ((CH_3)_2 SiO_{2/2})_{40}$$

Synthetic Example 3

387.1 g (0.13 mol) of dimethylpolysiloxane of which both terminals of the molecular chain are capped with hidoroxy-dimethylsilyl group represented by the following average structural formula: $HO(CH_3)_2SiO—((CH_3)_2SiO)_{38}—Si(CH_3)_2OH$ and 57.5 g (0.26 mol) of aminopropyl-triethoxysilane were mixed homogenously and then heated to 85 degree C. and removing ethanol during the heating. When the generation of ethanol stopped, the reaction mixture was cooled down to room temperature (25 degree C.). The obtained organopolysiloxane (B-3) was subject to structural identification by $^{29}Si$-NMR. From the analytical results and the reaction route, the product was identified to have the following average siloxane unit formula represented by the formula;

$$(H_2NC_3H_6(C_2H_5O)_2SiO_{1/2})_2 ((CH_3)_2SiO_{2/2})_{40}$$

Example 1 and Comparative Example 1-3

Coating compositions are prepared by uniformly mixed ingredients in the proportion of Table 1. The coating compositions were sprayed on the surface of paper and cured by passing 160 degree C. oven at 80 m/min speed. After post cure treatment at 65 degree C. for 72 hours, surface coated paper test pieces were obtained. The obtained test pieces were evaluated in anti-tape property, solvenn resistance, and anti-ink property. The results are shown in Table 2.

TABLE 1

| | |
|---|---|
| Acrylic resin | 65 |
| Cellulose acetate-butyl | 2 |
| Toluene | 5 |
| Ethyl Acetate | 16 |
| Cyclohexanone | 2 |
| Butyl Acetate | 9 |
| Silicone additive | 1 |

(weight %)

TABLE 2

| | Example 1 | Comparative Example 1 | Comparative Example 2 | Comparative Example 3 |
|---|---|---|---|---|
| Silicone additive | B-1 | B-2 | B-4 | B-5 |
| Anti-tape (time) | more than 15 | 12 | more than 15 | more than 15 |
| Solvent resistance | more than 10 | 5 | 8 | 6 |
| Anti-ink | no spoor | stained | stained | stained |

Test Methods:

Anti-Tape Property:

Nitto Denko No. 31B tape was put on the coated surface of the test piece, adhered with a rubber roller and peeled off. Such procedure was repeated 15 times. If the coated surface was damaged or the tape could not remove from the coated surface during the test, the test was terminated and number of the procedures was recorded.

Solvent Resistance:

The coated surface of the test piece was wiped with a cloth dipped in butyl acetate 10 times. If the coated surface was damaged during the test, the test was terminated and number of wiping was recorded.

Anti-Ink Property:

A few drops of ink was dropped on the coated surface and wiped off with a dry cloth. After wiping off, the coated surface was observed visually. If the ink was completely wiped off, the test result was rated as "no spoor". If a stain was observed in trace proportions, the test result was rated as "stained".

Here in after, the wording in the tables 1 and 2 are represented;

Acrylic resin: BS-965 acrylic resin; trade name (purchased from Jiangsu Sanmu Group Corporation)

Silicone Additive (B-1): the organopolysiloxane obtained in synthetic example 1

(B-2): the organopolysiloxane obtained in synthetic example 2

(B-4): an organopolysiloxane represented by the formula:

$(CH_3)_3SiO—(Si(CH_3)_2O)_{105}—(Si(CH_3)(C_3H_6NHC_2H_2NH_2)O)_2-Si(CH_3)_3$ (B-5): an organopolysiloxane represented by the formula:

$(CH_3)_3SiO—(Si(CH_3)_2O)_{86}—(Si(CH_3)(C_3H_6NH_2)O)_4—Si(CH_3)_3$

Comparative Example 4

Coating compositions prepared by the same manner of example 1 except silicone additive (B-3) was used instead of silicone additive (B-1). The coating composition was coated on the surface of paper and cured in 160 degree C. oven at 80 m/min. However, certain amounts of small bubbles were observed on the coated surface.

Comparative Example 5

744.5 g (0.25 mol) of dimethylpolysiloxane of which both terminals of the molecular chain are capped with hidoroxydimethylsilyl group represented by the following average structural formula: $HO(CH_3)_2SiO—((CH_3)_2SiO)_{38}—Si(CH_3)_2OH$, 33.2 g (0.15 mol) of aminopropyl-trithoxysilane, and 42.0 g (0.22 mol) of aminopropyl-methyldiethoxysilane were mixed homogenously and then heated to 85 degree C. and removing ethanol during the heating. When the generation of ethanol stopped, the reaction mixture was cooled down to room temperature (25 degree C.).

The obtained organopolysiloxane (B-6) was subject to structural identification by $^{29}$Si-NMR. From the analytical results and the reaction route, the product was identified to have the following average siloxane unit formula represented by the formula;

$(H_2NC_3H_6(CH_3)(C_2H_5O)SiO_{1/2})_{1.7}((CH_3)_2SiO_{2/2})_{83.3}(H_2NC_3H_6(C_2H_5O)SiO_{2/2})_{0.3}(H_2NC_3H_6(C_2H_5O)_2SiO_{1/2})_{0.3}$

Using the obtained organopolysiloxane (B-6), a coating composition and test piece was prepared in the same manner of example 1. Anti-tape properties and Solvent resistance of the test pieces were evaluated. The results were shown in Table 3.

TABLE 3

| | Comparative Example 5 |
|---|---|
| Silicone additive | B-6 |
| Anti-tape (time) | 9 |
| Solvent resistance | more than 10 |

What is claimed is:

1. A coating composition containing a nitrogen atom-containing organopolysiloxane represented by the average siloxane unit formula (1):

$$(R^1R^2R^3SiO_{1/2})_a(SiR^1{}_2O_{2/2})_b(R^2R^3SiO_{2/2})_c(R^2R^3{}_2SiO_{1/2})_d \quad (1)$$

wherein $R^1$ is a nitrogen-free, substituted or unsubstituted, monovalent organic group of 1 to 20 carbon atoms, $R^3$ is an organoxy group represented by —$OR^1$, "a" is a positive number of 0.7 to 1.3; "b" is a positive number of 2 to 500; "c" is a positive number of 0 to 10; "d" is a positive number 0.7 to 1.3; a+d is at least 2; and $R^2$ is a following general formula (2):

$$—R^4(NR^5CH_2CH_2)_eNR^6{}_2 \quad (2)$$

wherein $R^4$ is a divalent hydrocarbon group of 1 to 6 atoms, $R^5$ and $R^6$ are independently selected from hydrogen and unsubstituted or hydroxyl-substituted monovalent hydrocarbon groups of 1 to 50 carbon atoms which may be separated by an oxygen atom, and "e" is an integer of 0 to 4; and an organic polymer binder.

2. The coating composition of claim 1, wherein $R^2$ is —$C_3H_6NH_2$, —$C_3H_6NHC_2H_4NH_2$ or —$C_3H_6NHC_2H_4NHC_2H_4NH_2$.

3. The coating composition of claim 1, wherein $R^3$ is —$OCH_3$.

4. The coating composition of claim 1, wherein "c" is 0.

5. The coating composition of claim 1, wherein "b" is a number of 5 to 100.

6. The coating composition of claim 1, wherein the organic polymer binder is selected from the group comprising acrylic resin, polyurethane resin, epoxy resin, alkyd resin, polyamide resin, and the mixture of at least two of them.

7. The coating composition of claim 1, wherein the composition further comprises a solvent.

8. The coating composition of claim 1, wherein $R^2$ is —$C_3H_6NHC_2H_4NH_2$.

9. The coating composition of claim 1, wherein $R^3$ is —$OC_2H_5$.

10. The coating composition of claim 1, wherein "d" is 1.

11. The coating composition of claim 1, wherein "b" is 40.

12. A method for coating a surface of a material, wherein the surface material is coated with a coating composition according to claim 1.

13. A surface treated material with a coating composition according to claim 1.

14. The coating composition of claim 1, wherein "a" is 1.

15. The coating composition of claim 1, wherein $R^1$ is —$CH_3$.

16. The coating composition of claim 1, wherein $R^2$ is —$C_3H_6NHC_2H_4NHC_2H_4NH_2$.

17. The coating composition of claim 1, wherein $R^2$ is —$C_3H_6NH_2$.

* * * * *